United States Patent [19]
Schurman
[11] 4,180,540
[45] Dec. 25, 1979

[54] METHOD OF MAKING A REINFORCED BEARING APERTURE IN THERMOPLASTIC SHEET MATERIAL

[75] Inventor: Peter T. Schurman, Woodbridge, Conn.
[73] Assignee: The Plastic Forming Company, Inc., Woodbridge, Conn.

[21] Appl. No.: 25
[22] Filed: Jan. 2, 1979
[51] Int. Cl.[2] .......................... B29C 17/00; B29F 5/00
[52] U.S. Cl. .................................. 264/156; 264/237; 264/348
[58] Field of Search ................ 264/155, 156, 237, 348

[56] References Cited

U.S. PATENT DOCUMENTS

| | | | |
|---|---|---|---|
| 2,115,122 | 4/1938 | Prudden | 264/156 |
| 3,012,918 | 12/1961 | Schaar | 264/156 |
| 3,161,554 | 12/1964 | Blackford | 264/156 |
| 3,165,787 | 1/1965 | Carmack | 264/156 |
| 3,517,410 | 6/1970 | Rapisarda | 264/156 |
| 3,525,279 | 8/1970 | Christian | 264/155 |
| 3,546,327 | 12/1970 | Ruda | 264/156 |
| 3,719,736 | 3/1973 | Woodruff | 264/156 |
| 3,891,739 | 6/1975 | Lawson | 264/155 |
| 4,070,429 | 1/1978 | Uhlig | 264/155 |
| 4,132,519 | 1/1979 | Reed | 264/156 |

*Primary Examiner*—W. E. Hoag
*Attorney, Agent, or Firm*—St. Onge, Steward, Johnston, Reens & Noe

[57] ABSTRACT

Relatively light gauge thermoplastic sheet material is pierced by a hot punch to provide a bearing aperture. The hot punch is held in sheet-penetrating position long enough to cause plastic flow of displaced material and formation of a collar-like hub surrounding the aperture. The hot punch is withdrawn and replaced by a cool punch to retard further plastic flow of the displaced material, thereby fixing the aperture in desired size and shape. There results a bearing aperture having an axial length greater than the starting thickness of the sheet material, and consequently a larger bearing surface integrally formed locally in the sheet material. Apparatus for forming the bearing aperture is also disclosed.

5 Claims, 10 Drawing Figures

Fig. 10
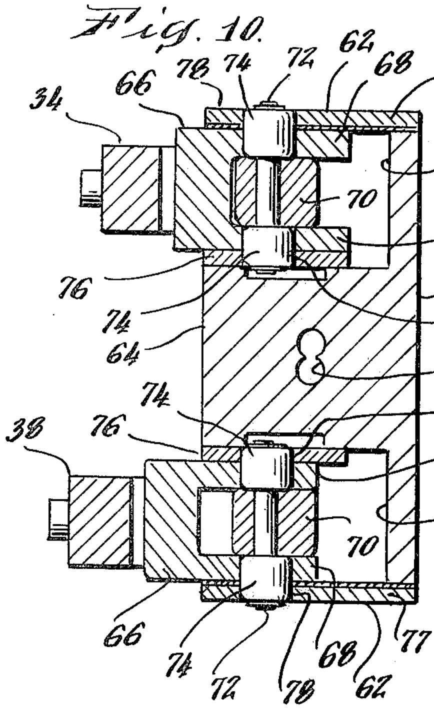
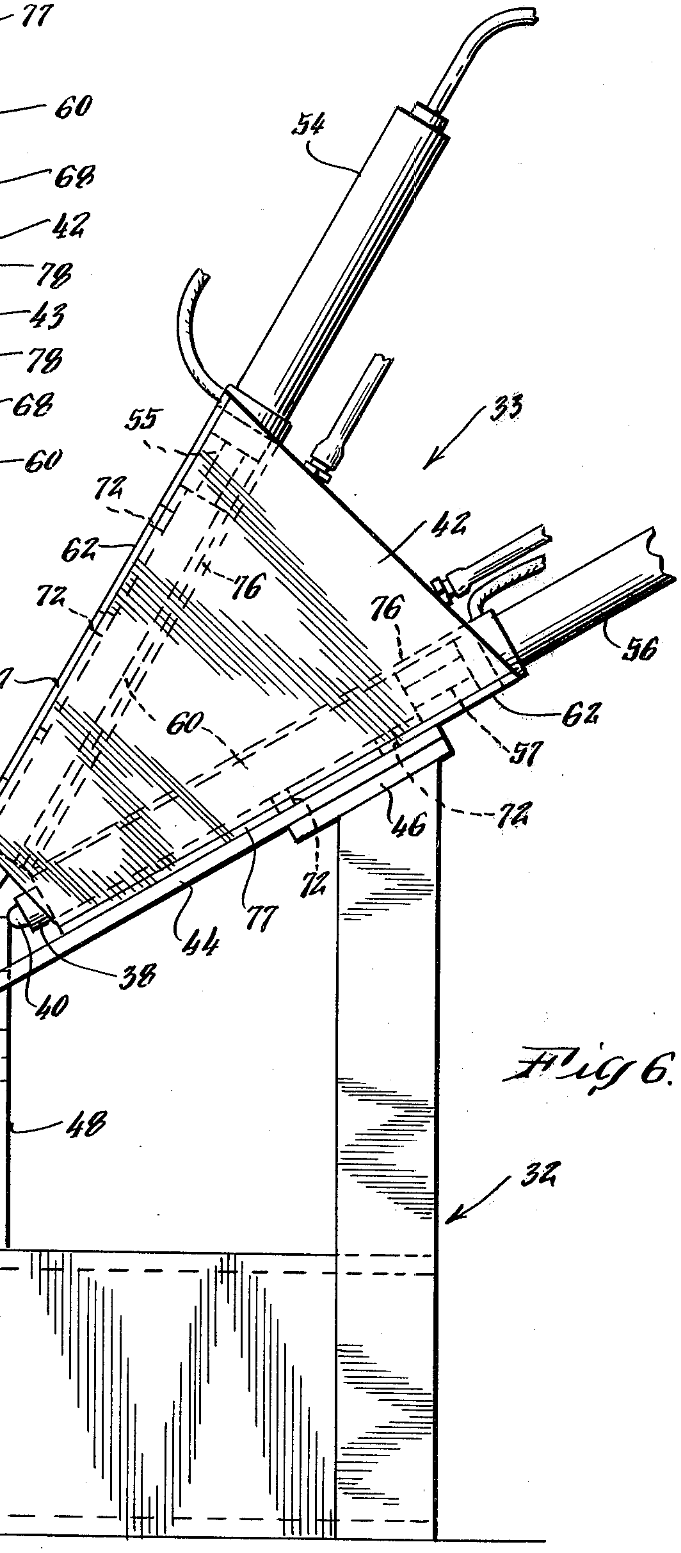
Fig 6.

METHOD OF MAKING A REINFORCED BEARING APERTURE IN THERMOPLASTIC SHEET MATERIAL

BACKGROUND OF THE INVENTION

1. Field of the Invention

This invention is directed to forming improved load-bearing apertures in thermoplastic sheet material, and more particularly to journal-pin receiving apertures for hinge structures integrally incorporated in relatively thin thermoplastic sheet material. Increase of the bearing area in the aperture is provided over that afforded by the original thickness of the sheet material. The invention has particular application to an improved hinge joint for blow-molded containers of thermoplastic sheet material incorporating separate base and cover members hinged together along their confronting edges, or for connection of "suitcase-type" handles to such containers, or for any similarly hinged joint in thermoplastic sheet material where increased load-bearing capacity is needed. Typical containers of the type mentioned include those used for storing and transporting articles such as tools, musical instruments, electronic equipment, etc., which require packaging for easier transportation and protection against damage but at the same time must be readily accessible. Hinged blow-molded containers fill this requirement excellently, but prior hinge connections used in them have not been fully satisfactory.

2. Description of the Prior Art

Blow-molded plastic containers comprised of a base and a hinged cover have been developed and used extensively for the aforesaid purposes. A common form of container is comprised of a base and a cover or lid member joined by an integral web, forming what is commonly known as a "living hinge." This arrangement provides certain economies of molding, since both the base and lid can be molded in one operation with the integral web forming the hinge between them. However, molding considerations of forming a "living hinge" often restrict the designs of a container. Also, due to the "memory" effect of the plastic in a living hinge, it is not possible to position the container elements in any position other than full open or full closed without auxiliary means. Finally, the living hinge in normal (closed) position is under strain and is subject to cracking after an extended period of time, or where the hinge is exposed to heat or a chemical stress-cracking agent. For that reason, molded base and lid members having separable, cooperating hinge elements which, when joined together, permit unrestricted hinging movement, are often preferred. Each container member in this instance carries one of two elements of a hinge set. For example, one element may comprise a journal pin while the other comprises a complementary bearing aperture in a container wall. One example of such container is described in U.S. Pat. No. 4,005,800, the disclosure of which is incorporated herein by reference. Where, as in the embodiment illustrated in that patent, the container is of the double-wall type, one set of hinge elements consists of a journal pin or trunnion integrally molded in the cover or lid, for example, while the cooperating hinge element consists of a receiving aperture drilled through the inner wall of the base in a side wall flanking the hinged edge of the container. In the prior construction the journal pins bear simply on the thickness of the wall, which is not very great at such points, so the strength of the hinge joint is accordingly limited. Heavy unit loads imposed on the bearing areas involved in those prior hinge constructions cause distortion of the aperture by cold (i.e., plastic) flow, thus altering the size and shape of the aperture. Such a condition is also prevalent where a hinge formation is employed in providing a "suitcase" handle for a container, in addition to the hinged cover and base combination mentioned above. The result of the cold flow is a weakened hinge joint, leading to accidental disengagement of the hinge elements, and separation of the carton base and lid, or dropping of the container in case of a defective handle hinge.

Improvement in the hinge strength would result if the wall thickness of the container could be increased in molding the bearing area for the hinge pins. However it is not readily possible, or at least not practical, in blow-molding to increase the thickness of the wall only at selected points of the container without increasing the thickness throughout other wall areas as well. This is not only unnecessary for strength considerations in such other areas, but is generally wasteful of material and adds appreciably to the weight and expense of the container.

SUMMARY OF THE INVENTION

It is accordingly a purpose of this invention to provide localized increase in wall thickness at selected points in articles formed of thermoplastic sheet material where bearing apertures for trunnion pins are to be formed. This is achieved without also requiring other areas of the sheet plastic material to be correspondingly increased in thickness.

In general terms, the foregoing objective is achieved by forming the aperture which is to serve as the bearing hole by first penetrating the thermoplastic sheet material with a hot punch to produce an aperture, and maintaining the punch in penetrating position long enough to cause plastic flow of the displaced material resulting from the penetration. The displaced material is caused to assume a collar-like formation about the aperture, such collar having an axial length substantially greater than the original thickness of the sheet material. The hot penetrating punch is then withdrawn and a cool forming punch is inserted, this being of the desired final size for receiving the journal. The cool punch serves to stop further plastic flow of the displaced material and cause it to freeze or set in that condition. When the plastic is sufficiently cooled, the forming punch is withdrawn, leaving an aperture with the aforesaid hub-like formation surrounding the aperture. The resulting bearing area afforded by the aperture thus formed is substantially increased over that provided by the original thickness of the sheet material.

Accordingly, it is an object of the invention to provide a separable hinge structure in thermoplastic sheet material having improved strength and providing greater assurance against accidental separation of the hinged members. It is a further object to produce such a hinge structure in an economical manner that is readily adapted to commercial production in existing blow-molding facilities. Other objects, aspects and advantages of the invention will be set forth in or will be understood from the following detailed description of a preferred embodiment, in conjunction with the accompanying drawings.

BRIEF DESCRIPTION OF THE DRAWINGS

FIG. 6 is a side elevational view of the apparatus;

FIG. 10 is a sectional view taken on line 10—10 of FIG. 8.

DETAILED DESCRIPTION OF PREFERRED EMBODIMENT

Figure 1:
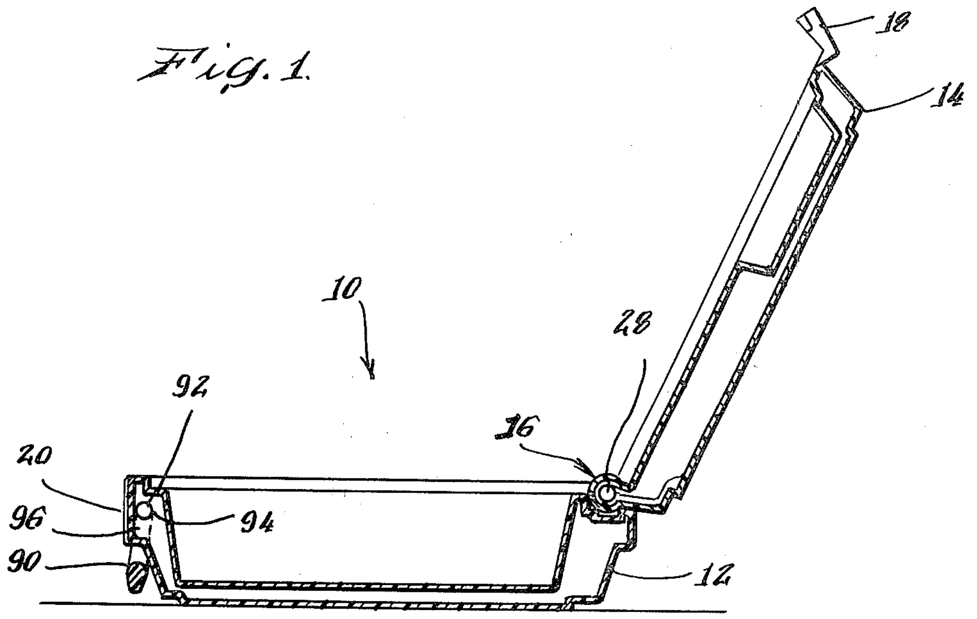
FIG. 1 is a view in side elevation of a blow-molded container incorporating typical hinge joints to which the invention is applicable.

The invention is illustrated in the accompanying drawings as embodied in a blow-molded, double-wall container 10 of thermoplastic material, such as high density polyethylene, ABS or the like, having a base 12 and lid 14 hinged together along a back edge 16 of the container by sets of hinge elements which will presently be discussed in detail. The base and lid members are separately molded and then interconnected by the hinge elements so that lid 14 is freely pivotable between closed and open positions relative to base 12. In the illustrated embodiment, lid 14 incorporates a latching tongue 18 which cooperates with a latch-receiving formation 20 on the corresponding edge of base 12 for retaining the lid in closed position. Further details of suitable latch structures are illustrated and described in U.S. Pat. No. 3,902,628, which is incorporated herein by reference.

Figure 2:
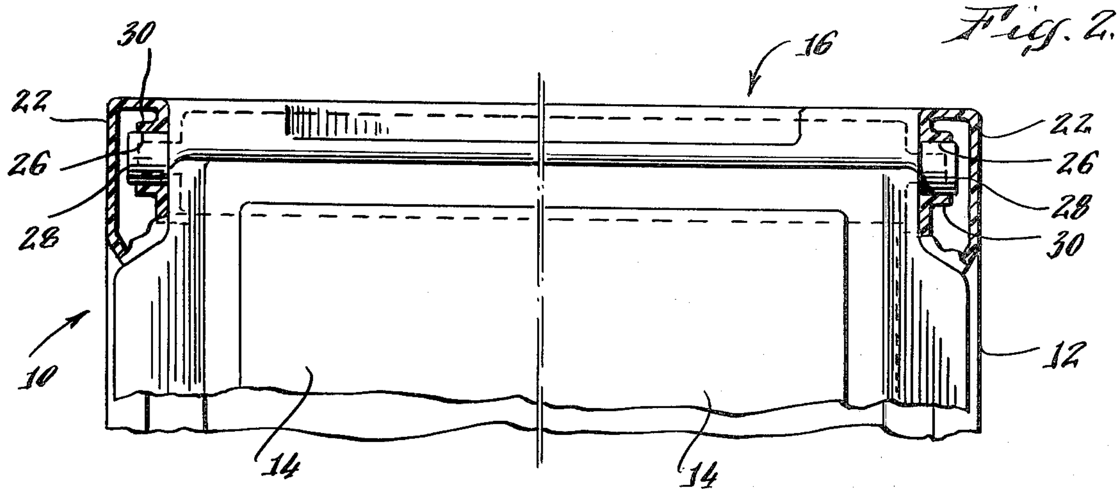
FIG. 2 is a fragmentary top plan view showing the hinged edge of the container of FIG. 1, with the lid in closed position, portions being shown in cross section for greater clarity.
Figure 3:
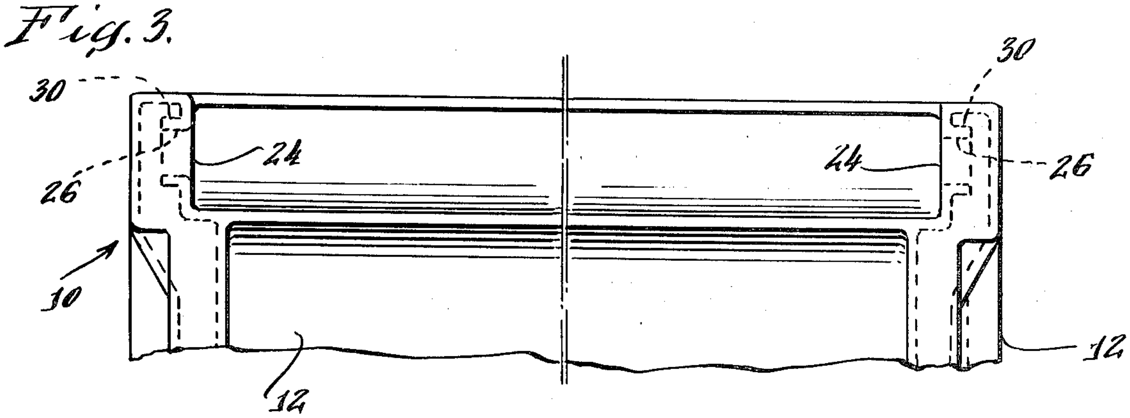
FIG. 3 is also a fragmentary top plan view similar to that of FIG. 2 but with the container lid removed.

Details of the hinge structure are more fully illustrated in FIGS. 2 and 3. Base member 12 is molded to provide a hollow boss 22 at each end of the hinged edge 16 of container 10. Bosses 22 project upwardly from the body of the container and are formed in their respective inner faces 24 to provide a bearing aperture 26 for reception of cooperating journal pins 28 molded integrally at opposite ends of the hinged edge of lid 14. Assembly of lid 14 to its base 12 is usually accomplished shortly after demolding one of the container members, while it is still hot and somewhat pliable so as to permit temporary deformation, as by bending, to allow the journal pins 28 to be snapped into the bearing apertures 26. When containers must be allowed to cool before assembly, a fixture generally resembling a shoehorn is used to deform the container members sufficiently to permit snap-assembly of journal pins into bearing apertures. After the container members are assembled, their rigidity prevents subsequent bending or deflection in normal use that would allow the hinge elements to disengage.

As such hinge joint constructions have previously been made, illustrated for example in U.S. Pat. No. 4,005,800, each of inner faces 24 of bosses 22 is drilled to provide the respective bearing apertures 26. In that prior arrangement, the bearing surface area between journal pins 28 and bosses 22 is thus limited to the wall thickness of inner faces 24 of the bosses. Limitations in blow molding techniques make it impractical to increase the thickness of the walls of inner faces 24 in bosses 22 without also increasing the thickness of at least adjacent wall areas, and this is not practical from an economic or weight standpoint.

In accordance with the present invention, a method is disclosed for formation of a hub-like reinforcement 30 surrounding bearing hole 26, whereby to increase substantially the load bearing contact area between journal pins 28 and bosses 22.

Apparatus for formation of the journal pin apertures is shown in FIGS. 4 through 10. In general this comprises a fixture 32 for receiving and properly holding the base member 12 of a container so as to position its hinge edge 16 relative to a dual punch set 33 comprising punch carriers 34, 38. See FIG. 6. One such set is located adjacent each end of the hinge edge 16 of the container base. In each set, upper carrier 34 is provided at its forward end with a heated pointed punch pin 36, the other (lower) slide 36 carrying an unheated punch pin 40. The carriers are supported on V-blocks 42, and these are in turn supported on plates 44 that are laterally adjustable on fixture 32 so as to accommodate containers of different widths. Fixture 32 has rails 46, 48 on which plates 44 rest in inclined relation to the container to be operated on and on which the punch sets are adjustably slidable.

Each of carriers 34, 38 is reciprocable longitudinally on block 42 toward and away from the hinged edge of the container. See FIG. 6. The included angle of V-block 42 is designed to cause intersection of the longitudinal axes of carriers 34, 38 at the desired location of the aperture to be formed. Each carrier is also displaced laterally, i.e. along the hinge axis, concurrently with its retraction and extension. Such combined action causes the respective punch pins to engage and penetrate walls 24 of bosses 22. See FIGS. 7 and 9. The pins are sized to provide apertures which make a good load-bearing fit with the journal pins 28. Pins 36 of carriers 34 in each set are heated to a high temperature, as by an electrical resistance coil 37 received in head 50 of slide 34, to facilitate piercing the wall of the boss. Pins 40 of carriers 38, however, are unheated and therefore relatively cool. These are inserted into apertures 26 after the heated pins have been withdrawn. The purpose of the second punch pin is to facilitate proper shaping of the apertures while the thermoplastic wall material is still moldable after penetration by the hot punch pin, thereby retain the desired aperture shape while the plastic material cools sufficiently to acquire a set.

Further details of the aperture forming equipment will now be presented.

Fixture 32 includes a pair of side brackets 52 which are mounted at the lower ends of the respective plates 44 supporting the punch sets. Brackets 52 are provided with adjustable stops 53, and the brackets and their stops guide an operator in positioning a container base 12 properly and supporting it correctly, relative to carriers 34 and 38 and their respective punch pins 36 and 40, during the aperture forming process.

With a container base 12 positioned in fixture 32 (e.g. FIG. 6), the operator initiates the aperture forming process by depressing a control switch 51 on fixture 32.

Figure 7:
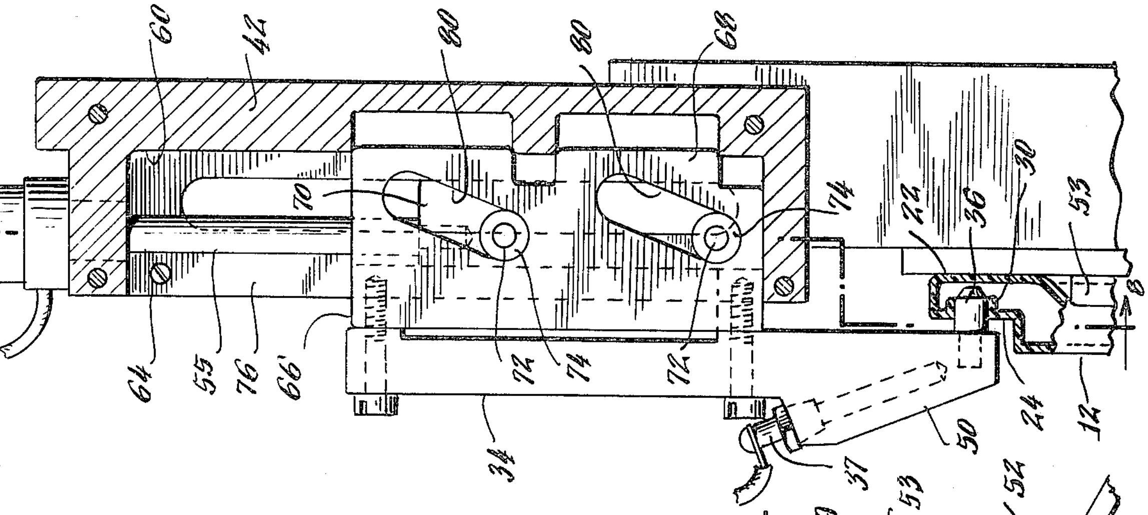
FIG. 7 is a fragmentary top plan view taken on line 7—7 of FIG. 8.

This operates pneumatic actuator 54 of each punch set 33 mounted on the rear face of blocks 42. Each actuator 34 is connected by rod 55, to a carrier 34 to advance it along a track provided by blocks 42, as more fully explained presently, until its heated punch pin 36 is positioned adjacent the respective inner face 24 of boss 22 of the container base 12. Upon reaching this point, carrier 34 moves laterally toward the adjacent face of V-block 42. This lateral movement is effected by a slide arrangement in block 42 to be discussed presently. Such lateral movement causes the point of hot punch pin 36 to contact and penetrate the wall of boss 22, as seen in FIG. 7, producing the bearing aperture 26 and also the hub-like formation 30, utilizing the displaced thermoplastic material for this purpose.

Carrier 34 is then retracted by actuator 54, during which the carrier first moves laterally away from the face of V-block 42 to disengage pin 36 from aperture 26 before returning to its starting position. Immediately thereafter, lower carrier 38 is advanced by its actuator 56 to position punch pin 40 opposite the just-formed aperture 26, at which point carrier 38 is bodily shifted laterally along the hinge line toward V-block 42, just as in the case of carrier 34. This causes the cool punch pin 40 to be inserted in the just-formed aperture. If desired, blocks 42 may incorporate cooling water passages 43 (FIG. 8) to maintain pins 40 relatively cool. The contact of the cool punch with the aperture wall extracts heat from the hub-like formation 30, causing it to freeze or set in proper location and shape. Carrier 38 is then retracted by actuator 56, again after first being moved laterally away from V-block 42 to disengage pin 40 from aperture 26.

The aperture forming is thus completed, and the operator can remove the container base from fixture 32 and position another in its place. The cycle of operation described can of course be automated by conventional programmer type controls.

The lateral translation of all carriers 34, 38 in the process described above is accomplished in the same manner for each of them, so the following description of one will be illustrative of the others.

Figure 9:
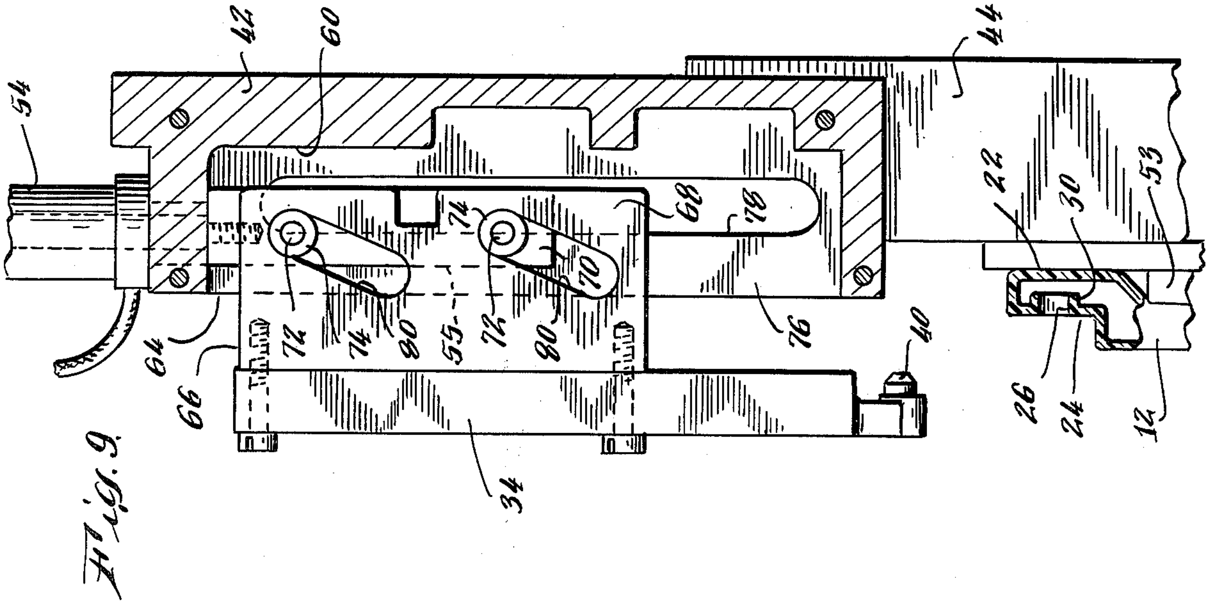
FIG. 9 is a sectional view along line 9—9 of FIG. 8.
Figure 4:
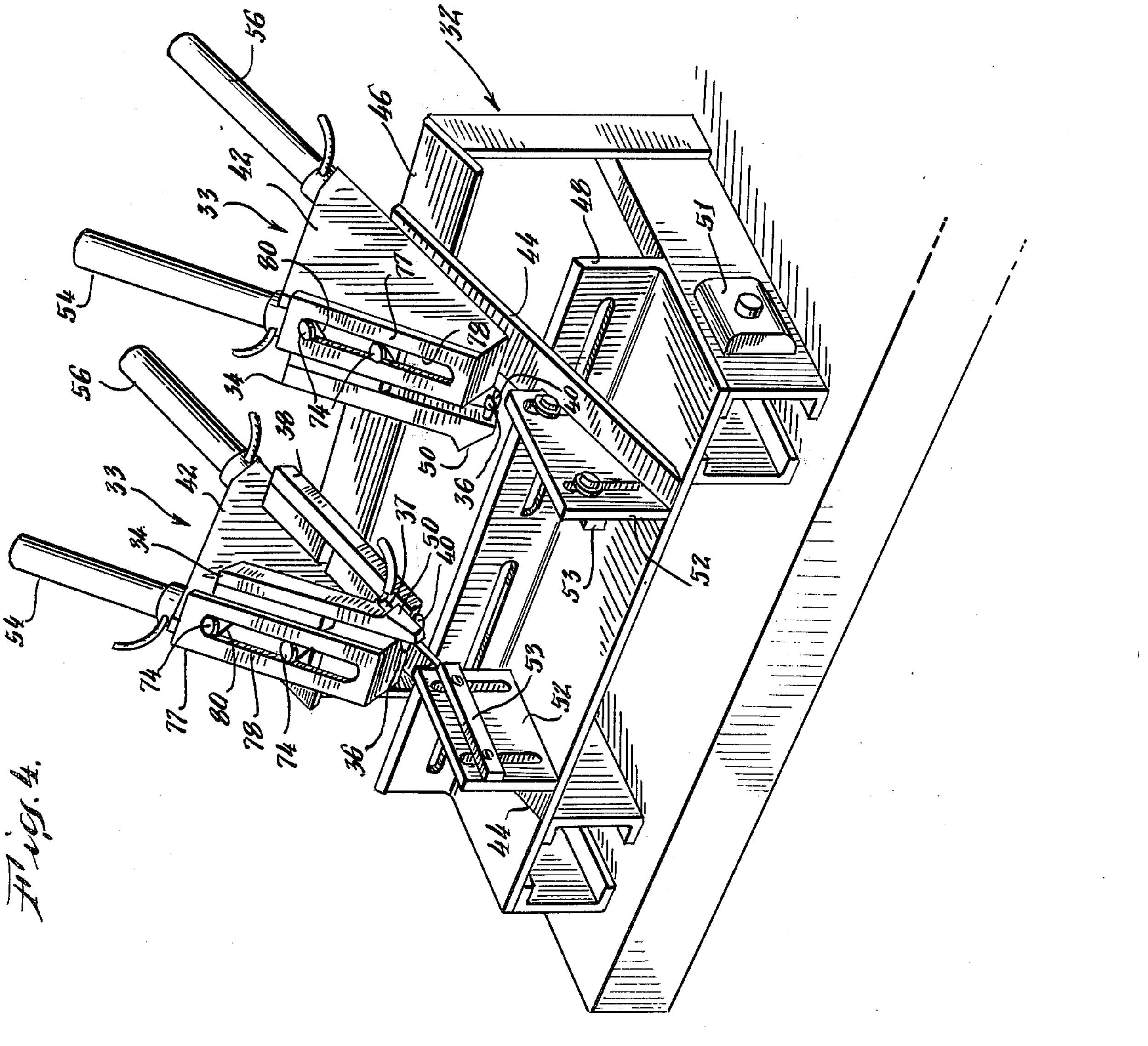
FIG. 4 is a front perspective view of apparatus adapted to form the reinforced bearing apertures in accordance with the invention.
Figure 5:
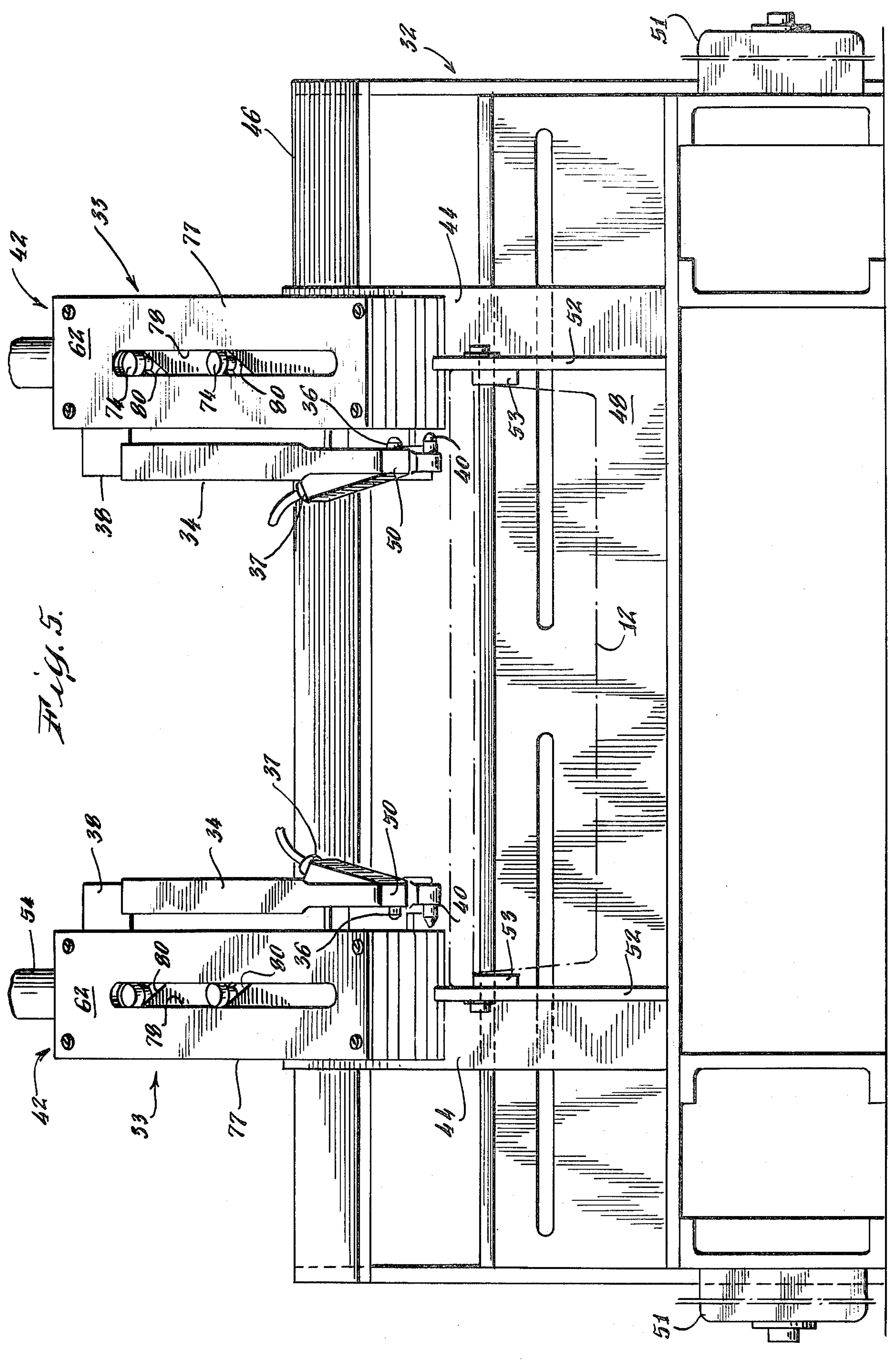
FIG. 5 is a front elevational view of the apparatus seen in FIG. 4, on an enlarged scale.
Figure 8:
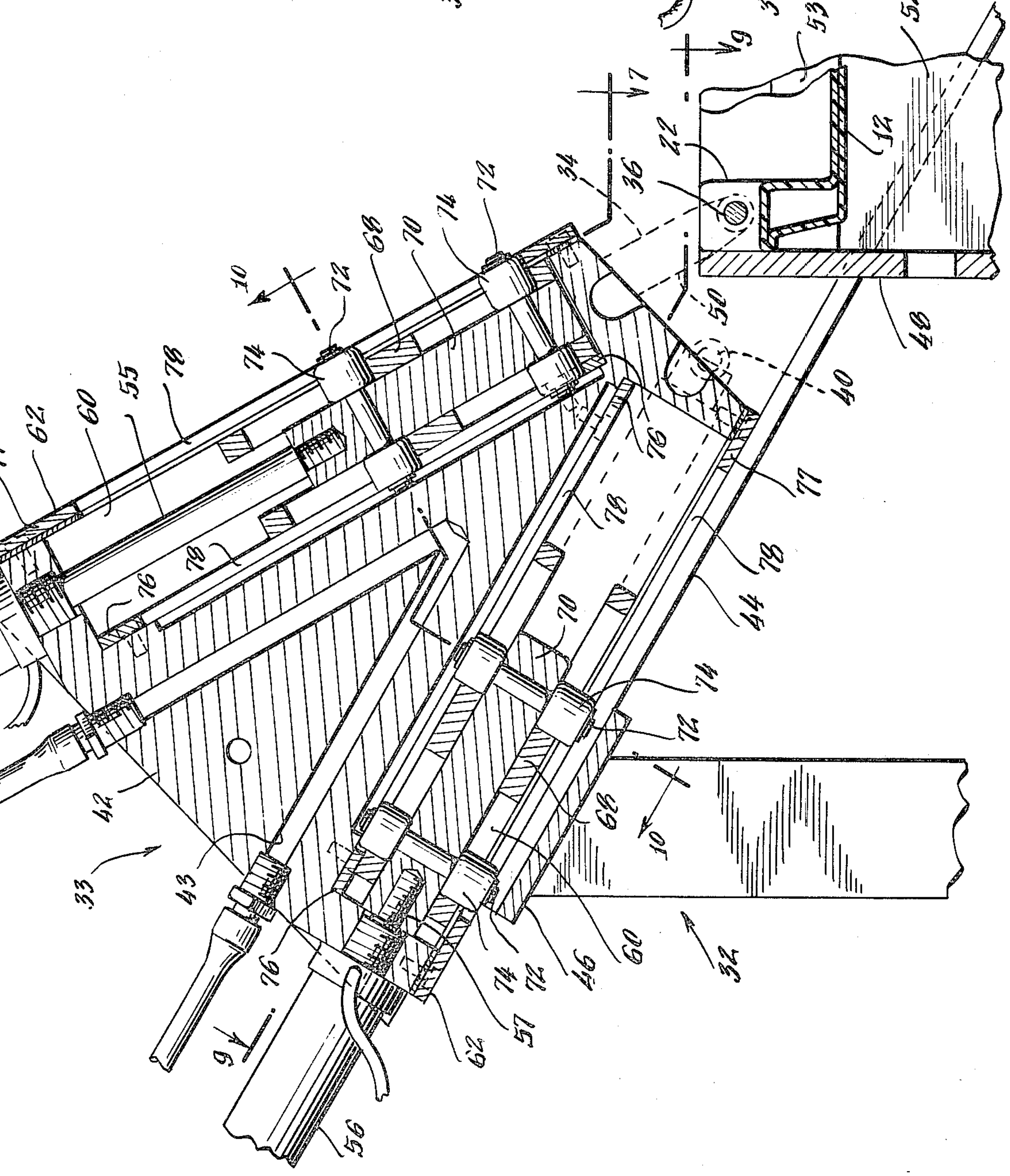
FIG. 8 is a sectional view taken on line 8—8 of FIG. 7.

Referring more particularly to FIGS. 7–9, V-block 42 is formed with recesses 60 let into its opposite edge faces 62. Each of these recesses also opens laterally onto the inner side face 64 of V-block 42. A shoe 66 is received in each of recesses 60. Carriers 34, 38 are secured to the shoes to support the carriers adjacent the inner face of the V-block. See FIGS. 7 and 10.

Each carrier shoe 66 is identical, being substantially U-shaped and having paired legs 68 extending horizontally (parallel to edge faces 62) within the respective recess 60. A bearing block 70 makes a sliding fit between legs 68, and each block is secured to the end of one actuator rod 55 or 57. Actuators 54, 56 thus reciprocate their respective bearing blocks 70 within recesses 60, within limits defined by the opposite ends of the recess. Each block 70 has two bearing shafts 72 which are spaced apart and disposed perpendicular to the respective edge face 62, and each shaft 72 supports a pair of rollers 74. The rollers in each pair are located on opposite faces of block 70 (see FIG. 10) and are retained on shafts 72 by spring clips or other conventional means. An inner wear plate 76 is secured in the bottom of each recess 60, and a complementary outer wear plate 77 is secured to the outer edge face 62 so as to sandwich a carrier shoe 66 between them. Each wear plate 76, 77 has a longitudinal slot 78 adapted to receive rollers 74, thereby guiding them and their associated bearing blocks 70 for straight-line reciprocation. Duplicate sets of cam slots 80, as seen best in FIG. 9, are provided in the opposite legs of carrier shoes 66. Rollers 74 are also received in slots 80. Interaction between rollers 74, longitudinal slot 78 and cam slots 80, as bearing block 70 is reciprocated, causes shoe 66 to shift laterally relative to its V-block 42. As bearing block 70 is retracted by its actuator, shoe 66 is urged laterally away from its V-block; alternatively when bearing block is advanced, the shoe is urged toward the V-block. Camming action on shoe 66 takes effect to cause the aforesaid lateral shifting to occur at the end of the advancing stroke and the start of the retraction stroke of the actuator. This accordingly positions the respective punch pins 36 or 40 opposite the point on the carton wall where an aperture is desired, before the mandrel is moved laterally into engagement with the carton on the advancing stroke; and alternatively disengages the punch pin from the aperture before retracting the carrier longitudinally on the return stroke.

The foregoing description has illustrated the formation of a hinge joint for joining a carton base and lid. The same arrangement can obviously be applied to forming a hinge joint between a container and a suit case-type handle, such as handle 90 at the front edge of the carton seen in FIG. 1. The handle, which is of U-shape having inwardly directed journal pins 92 adjacent the free ends, is attached to the container by apertures 94 provided in a suitable boss 96 of the container. Again the apertures can be formed in the manner and with the apparatus above described.

The foregoing specific embodiments of the present invention are to be understood as illustrative. Modifications may be made consistent with the teaching herein to adapt the invention to particular requirements, as will be apparent to those skilled in the art.

What is claimed is:

1. Method of forming a bearing aperture in thermoplastic sheet material of given thickness, which comprises:

supporting a sheet of said material in fixed position and penetrating said thickness with a heated punch pin of size approximating that of the desired finished aperture;

maintaining said heated punch pin in penetrating position in said material long enough to produce plastic flow of the displaced material resulting from said penetration, thereby causing said displaced material to assume a collar-like formation about said aperture, said collar formation having an axial thickness greater than said given thickness of the starting sheet material;

withdrawing said heated punch pin from the aperture thus formed and promptly inserting a cool punch pin therein of a size corresponding to that of the desired finished aperture, and maintaining said cool punch pin in penetrating position in said material long enough to inhibit further plastic flow in said collar-like formation; and withdrawing said cool punch pin from said aperture.

2. The method as defined in claim 1, which further comprises continuously supplying heat energy to maintain said heated punch in heated condition, and supplying cooling means to maintain said cool punch in cool condition.

3. A method of forming reinforced journal pin receiving apertures for a hinge structure in a molded thermoplastic article comprising members of given wall thickness connected together by said hinge structure, said hinge structure comprising a pair of journal pins on a first member and a complementary pair of pin-receiving apertures formed in the wall of the other member, said method comprising supporting said other member in fixed position and advancing a pair of heated punch pins to cause penetration of the walls of said member and formation of a pair of apertures in position to respectively receive the journal pins of said first member, said heated punch pins having a size approximating that of the journal pins, maintaining said heated punch pins in said wall-penetrating position long enough to produce plastic flow of the displaced material resulting from said penetration and causing said displaced material to assume a collar-like formation about said aperture, said formation having an axial thickness greater than said given wall thickness, withdrawing said heated punch pins from the apertures thus formed and promptly inserting therein a pair of cool punch pins of a size adapted to produce a bearing fit with said journal pins, and maintaining said cool punch pins in penetrating position in said walls long enough to stop further plastic flow in said collar-like formation; and retracting said cool punch pins from the apertures thus formed.

4. The method as defined in claim 3, which further comprises continuously supplying heat energy to maintain said heated punch pins in heated condition, and supplying cooling means to said cool punch pins to maintain them in cool condition.

5. The method as defined in claim 3, wherein each pair of heated and cool punch pins is respectively first advanced from a starting position in a longitudinal direction into position adjacent walls of said container member in which the apertures are to be formed, the punch pins of each pair being then moved transversely of said first direction into penetrating position relative to said container member walls, said punch pins are then withdrawn out of wall penetrating position, and finally are retracted longitudinally to their starting position.

* * * * *